BURST INPUT REACTANCE COUPLED ASYNCHRONOUS LOGIC CIRCUIT

Filed July 21, 1965

INVENTOR.
Yasuo Komamiya
Takeji Sugiyama
BY Ernest G. Montague
Attorney

INVENTOR.
Yasuo Komamiya
Takeji Sugiyama
BY Ernest G. Montague
Attorney

INVENTOR.
Yasuo Komamiya
BY Takeji Sugiyama
Ernest G. Montague
Attorney

May 13, 1969 YASUO KOMAMIYA ET AL 3,444,392
BURST INPUT REACTANCE COUPLED ASYNCHRONOUS LOGIC CIRCUIT
Filed July 21, 1965 Sheet 4 of 5
Fig. 25
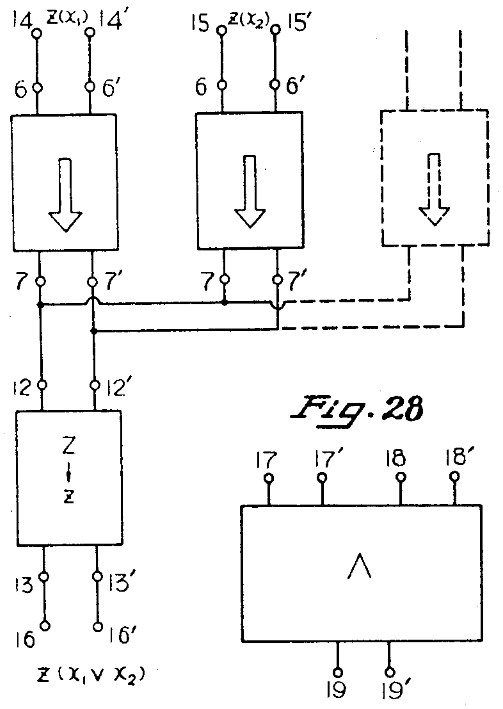
Fig. 25, Fig. 28
Fig. 26
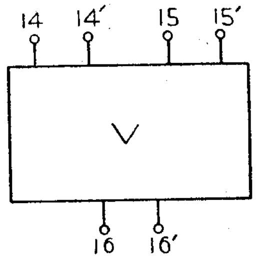
Fig. 27
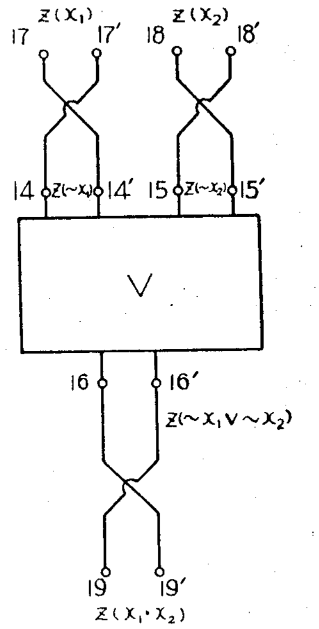
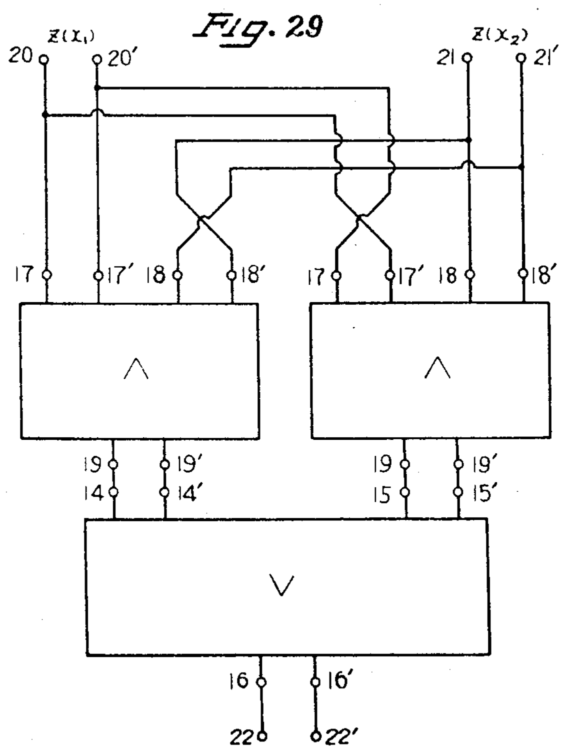
Fig. 29
INVENTOR.
Yasuo Komamiya
BY Takeji Sugiyama
Ernest G. Montague
Attorney INVENTOR.
Yasuo Komamiya
Takeji Sugiyama
BY
Ernest G. Montague
Attorney United States Patent Office 3,444,392
Patented May 13, 1969

3,444,392

BURST INPUT REACTANCE COUPLED ASYNCHRONOUS LOGIC CIRCUIT

Yasuo Komamiya, Yokohama, and Takeji Sugiyama, Tokyo, Japan, assignors to Agency of Industrial Science and Technology, Tokyo, Japan, a governmental agency of Japan Continuation-in-part of application Ser. No. 116,815, June 13, 1961. This application July 21, 1965, Ser. No. 482,015
Claims priority, application Japan, June 18, 1960, 35/28,232
Int. Cl. H03k *19/08, 19/10, 3/26*
U.S. Cl. 307—206 8 Claims

ABSTRACT OF THE DISCLOSURE

An asynchronous electronic logic circuit comprising a two terminal element having an N-type current-voltage characteristic, a resistor, an inductance, and a D.C. source connected in series such that the circuit has a monostable operating point. A reactance input means is operatively connected to the circuit. The two terminal element operates on a stable point of the N-type characteristic curve and means are provided for supplying an input signal in the form of a burst of electrical oscillations representing one binary condition and the absence thereof representing the other binary condition, the input signal causing the operating point of the two terminal element to be shifted along its N-type characteristic curve so that the circuit oscillates and transmits an output signal, whereas when no input signal is received, the two terminal element returns to its stable point no oscillation being generated and the circuit transmitting no output signal.

Figure 1:
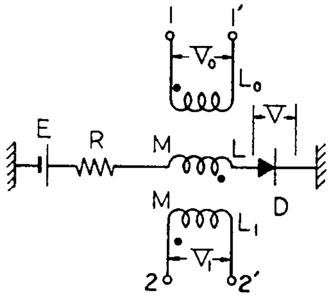

This application is a continuation-in-part of a formerly filed patent application, Ser. No. 116,815, filed June 13, 1961 now abandoned, for an Electronic Logic Circuit.

The present invention relates to an electronic logic circuit used in an extra-high speed electronic computer formed by the use of two terminal elements having an N-type volt-ampere characteristic.

Heretofore, in the electronic computer, a logic computation has been usually effected in such a manner that 0, $v(0,I)$ of voltage (current) corresponds to the binary codes 0, 1 or wave $-v$, $v(-I,I)$ and the like different for 180° in phase corresponds thereto, and the circuit of the electronic computer is roughly divided into a synchronous type and an asynchronous type. However, the synchronous type has a defect since its operating speed is slower than that of the asynchronous type. Owing to the asynchronous type using a direct current like signal, in the usual case except a relay computer, it has the defect that it has few fan-outs.

Further, prior art devices have not been capable of operating at ultrahigh-speed because other than "Esaki" diodes have been used reducing the frequency response of the circuit. The asynchronous systems previously utilized were also required to be resistance coupled because in the all system a direct current balancing problem was the limiting feature.

Also, as a logic circuit uses elements having an N-type volt-ampere characteristic, there is a logic circuit in which the sequence of the operating elements is determined to have a directional property by using a three phase synchronous signal as a power source and the logic circuit is formed parametron-like by a pair of elements, and also there is a logic circuit which has a directional property by using a logical product as a fundamental circuit, that is published by one of the inventors of the present application and others. However, owing to the fact that a uniform characteristic for all elements employed is required, it has the objectionable feature that it is subjected to a fair limitation for forming its circuit.

A number of prior art devices have disclosed the use of a magnetic core as a component of an all logic circuit or a "Goto Pair" have so been utilized. However, in the first instance the use of the magnetic core does not lend itself to ultra high frequency switch, while in the latter instance a negative logic circuit could not be constructed to operate properly.

This one object of the present invention is to provide an electronic logic circuit, wherein an element with two terminals having an N-type volt-ampere characteristic, a resistance, and an inductance are connected directly to a D.C. source and wherein they form a circuit as a foundation set with a series resistance value so as to have a monostable point to the elements whereby a logical computation is performed by corresponding electric waves or by a corresponding combination of electric waves and a signal (including 0 level) of only direct component to the binary codes 0, 1.

Another object of the present invention is to provide an electronic logic circuit in which the cooperation of a two terminal element as an "Esaki" diode and standard inductive, capacitive and resistive elements form a negative operating circuit.

Yet a further object of the present invention is to provide an electronic logic circuit which does not require a resistance coupling and may utilize inductive or capacitive coupling.

To the binary codes 0, 1, for instance, the following electric signal is assumed to correspond.

(I) An electric oscillation wave having negative direct component or an electric oscillation wave having a negative amplitude larger than a positive amplitude corresponds to the binary code 0, and the electric oscillation wave having positive direct component or the electric oscillation wave having a positive amplitude larger than a negative amplitude is corresponded to a binary code 1.

(II) A signal corresponding to the binary code 1 is the same as that in (I), and as a signal corresponding to the binary code 0, an electric non-oscillation signal or an electric signal at 0 level corresponded.

(III) To the binary code I, corresponds an electric oscillation wave, that is, an electric oscillation wave (i.e., sine wave) having an amplitude of the same magnitude at the positive or negative direction, and a signal corresponding to the binary code 0 is the same as that of (II).

As above described, the present invention uses the electric oscillation wave, and in this case, as the phase is entirely out of order, even when the frequency is caused to be very high, the lay out of a circuit is not effected to any degree, and owing to the utilization of the self-oscillation, its frequency can be used up to the highest frequency of the element. Moreover, at the first front edge of the self-oscillation, elements at the next stage can be operated, and consequently, any information can be transmitted in succession at a speed near the highest operating speed. Further, heretofore, these elements have been selected usually so as to take a bistable state, but in accordance with the present invention, as only a monostable point is necessary, an uneven quality of each of the elements employed is almost out of order in principle, and consequently, the yield rate of the elements is made to be sufficient and the formation of a circuit can easily be effected.

In the following explanation of the present invention, in order to facilitate the understanding thereof, firstly, it refers to a fundamental circuit by an electric oscillation system with the complex number three valued logical mathematics shown as a reference, and next, it refers to a corresponding relation by the item (I) between the binary code and of the complex number a propositional value, and then it refers to each of the circuits of the present invention using the above principle. Finally it refers to each of the circuits of the present invention corresponding to (II) and (III), since the circuits produced by the corresponding relation of (I) can also be applied to the cases of (II) and (III).

The aforesaid objects of the present invention, and other objects which will become apparent as the description proceeds, are achieved by providing an electronic logic circuit comprising an Esaki diode having an N-type current-voltage characteristic, a resistor, an inductance, and a D.C. source connected in series such that said circuit is provided with a monostable operating point, said Esaki diode operating on a stable point of the N type characteristic curve whereby upon the supply of an input signal in the form of an electrical oscillation the operating point of said Esaki diode being shifted on its N type characteristic curve so that said circuit begins oscillating by self-oscillation and transmits an output signal, while when no input signal is received, said Esaki diode returns to its stable point no oscillation being generated and said circuit transmitting no output signal.

(1) A fundamental circuit by an oscillation system

In FIGURE 1, E, R, L, and D are, respectively, a D.C. source, a resistance, an inductance and two terminal elements (in this embodiment, only the application of the Esaki diode is described as an example) having an N type volt-ampere characteristic, and $L_0$ and $L_1$ are, respectively inductances connected with input terminals 1 and 1' and with output terminals 2 and 2'. M is a coefficient of mutual inductance between the inductances $L_0$ and L and between $L_1$ and $L_0$. $V_0$ is a voltage applied to the terminals 1 and 1' as an input information. V is the voltage produced at L causing electric oscillations, as set forth below, for exciting the terminal D by the voltage induced by the voltage $V_0$ through M between the inductances $L_0$ and L, and $V_1$ is the voltage induced at the inductance $L_1$ by V through M between the inductances L and $L_1$. Further, a mark of "." applied to each of the inductances $L_0$, $L_1$, and L shows the relations of polarity in such manner that when a positive voltage is applied to the "." terminal of the inductance $L_0$, a positive voltage appears on the "." terminal of the inductance L, and also a positive voltage appears on the "." terminal of the inductance $L_1$, and in the following description this indicating method is used.

Figure 2:
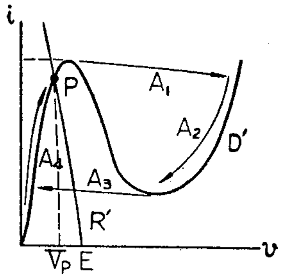
Figure 3:
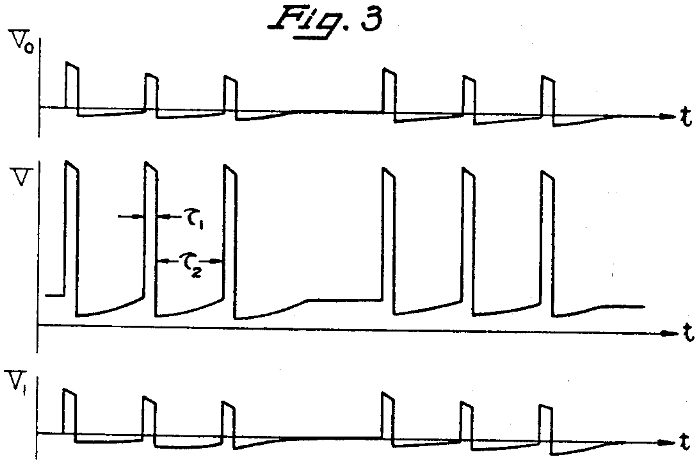

Referring now to FIGURE 2, a curve D' indicates a volt ($v$)-ampere ($i$) characteristic of the terminal elements D of FIGURE 1, and R' indicates a straight line of the resistance R of FIGURE 1. E and R are set in such manner that D is put on a stable point P when the voltages are not applied to 1 and 1' in FIGURE 1. Now, when a signal in the wave form as shown in V of FIGURE 3 is received from the input terminals 1 and 1', D is excited during the peak value of $V_0$, so as to go over the peak of the curve D'. Thus, the condition of a circuit composed of E, R, L and D changes its state in the form of self-excitation along an arrow mark of $A_1$, $A_2$, $A_3$ and $A_4$ of FIGURE 2 under the lapse of time decided by the constant of the circuit, so as to cause an electric oscillation, as shown by V of FIGURE 3. In this case, in this figure, there is shown the case when the number of oscillations is adjusted by 1 to 1. However, the ratio of the number of oscillations can be changed at will be adjusting the inductance L or any other constant. As D the terminal element is set at a stable point, the point P of FIGURE 2, when an input is not received, when electric oscillation waves having positive direct components, and time widths $\tau_1$ and $\tau_2$ of its voltage wave forms having the relationship $\tau_1 < \tau_2$, as shown in FIGURE 3. Accordingly, wave forms induced at the inductance L through M between L and $L_1$ are made by $V_1$, as shown in FIGURE 3, and the direct components are removed by the transformer effect, and consequently, when D is not caused to have electric oscillations, this is also at the state of a voltage at 0 level. When D is caused to have electric oscillations, the amplitude at a positive direction becomes very large in comparison with that at a negative direction. If the polarity of $L_1$ is reversed, it is obvious that an amplitude at a negative direction is made considerably larger in comparison with that at a positive direction. In FIGURE 3 the abscissa $t$ indicates the time. Further, electric oscillation wave forms having positive direct components as above described or electric oscillation waves having larger amplitude of positive direction than that of the negative direction are designated as at the left side of FIGURE 4, electric oscillation wave forms having negative direct components or electric oscillation waves having a larger amplitude of negative direction than that of the positive direction are designated as at the middle of FIGURE 4, and when electric oscillations are not caused, it is designated as at the right side of FIGURE 4. Also, if $V_0$ is applied in a reverse polarity inversely as in the case of causing electric oscillations by $V_0$ in FIGURE 1, the voltage of D is moved by a slight amplitude toward the left side from the point P of FIGURE 2 by induced voltage, however, a state of electric oscillations is not caused, and consequently electric oscillation waves of the voltage, as above described, do not occur. The above describes one example in the case effecting the coupling between the stages by electromagnetic induction effects. As such coupling method, any other resistance coupling, or condenser coupling or the combination of the above couplings can be used.

Figures 4, 5, 6:
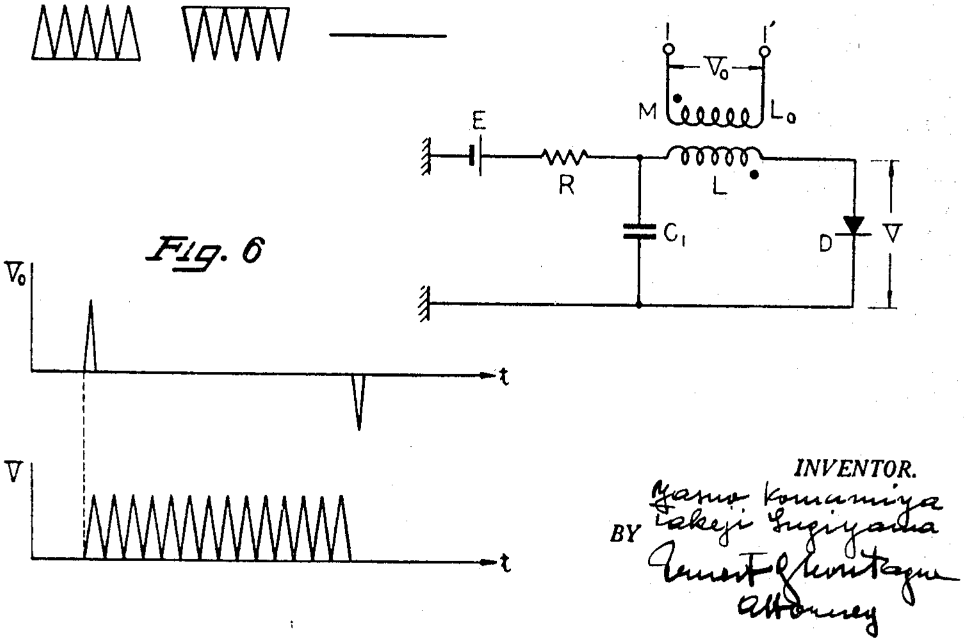

As shown in FIGURE 5, when a condenser $C_1$ is connected in parallel with a series circuit of L and D of FIGURE 1, a self-holding circuit is formed for a state of electric oscillations of diode D. That is, as shown in FIGURE 6, when $V_0$ is firstly positive voltage is applied to the input terminals 1, 1', D is oscillated, and next the electric oscillation state is maintained as shown by V of FIGURE 6 until a negative voltage is applied, as shown in FIGURE 6, and the figure of V is adopted as in the method indicated in FIGURE 4. The voltage $V_1$, applied to the input terminals 1 and 1' is not necessarily a positive and negative pulse, and it is clear that the voltage of the electric oscillation waves having respectively positive direct components or the electric oscillation waves having an amplitude in positive direction larger than that in the negative direction and electric oscillations having a negative direct component or the electric oscillation waves having an amplitude in negative direction larger than that in the positive direction may be used. Further, the abscissa $t$ in FIGURE 6 indicates the time.

(2) Complex of three valued logical mathematics

As a complex number proposition, there is used a hyperbolic number $k (k^2=1,\ k \neq \pm 1)$ to be a unit of a hypercomplex number, however, in the following, the complex number proposition is defined as follows:

The combination $(x, y)$ of real propositions $x$, $y$ (each $x$ and $y$ take any value of 0, ½ or 1) is considered, and the logical sum, logical product and the like are defined as follows:

[The definition 21] logical sum $(a_1, a_2) \vee (b_1, b_2)$ $$\{(a_1, a_2) \vee (b_1, b_2)\} = (a_1 \vee b_1,\ a_2 \vee b_2)$$

[The definition 22] logical product $(a_1, a_2) \cdot (b_1, b_2)$ $$\{(a_1, a_2) \cdot (b_1, b_2)\} = (a_1 b_1 \vee a_2 b_2,\ a_1 b_2 \vee a_2 b_1)$$

Conveniently, when there is no fear to be caused by an error, the mark "." of the logical product may be omitted.

[The rule 21] it is decided to be described as $$(a_1, 0) = a_1,\ (0, a_2) = k a_2$$

Accordingly, when the [rule 21] is applied to [The definition 21]

$$(a_1, a_2)=a_1\text{v}ka \qquad (1)$$

[The definition 23] necessary and sufficient condition for $$(a_1, a_2)=(b_1, b_2) \text{ is } a_1=b_1, \text{ and } a_2=b_2$$

[The definition 24] $\delta ix$, where each of $i$ and $x$ takes any value of 0, ½ or 1.

When $i=x$ $$\delta ix=1$$

When $i\neq x$ $$\delta ix=0$$

Especially, when $x$, $x_1$, $x_2$ do not take the value except 0 or 1, it is clear that the following formulas are obtained:

$$\delta_0 x=\delta_1(\sim x)$$
$$\delta_1 x=\delta_0(\sim x)$$
$$\delta_1(x_1, x_2)=\delta_1 x_1 \text{v} \delta_1 x_2$$
$$\delta\tfrac{1}{2}\{\delta_1 x \text{v} \tfrac{1}{2}\}=\delta_0 x$$

where, it means that $\sim x=1-x$

The rule 22, about the weakness of the symbols.

In the sequence of $\delta$ symbol, logical product, logical sum, the $\delta$ symbol at the left side of the above is the strongest, and going toward the right is gradually weakened.

[The definition 25] $R(a)$ $K(a)$

When $a=a_1\text{v}ka_2$ holds, then $R(a)=a_1$ and $K(a)=a_2$ hold.

$R(a)$, $K(a)$ is called, respectively, as a real part and a parabolic part of the complex proposition.

The parabolic part is made by (the rule 21) with regard to the complex proposition to be $$(a_1, 0)\text{v}(b_1, 0)=(a_1\text{v}b_1, 0)=a_1\text{v}b$$
$$(a_1, 0)\cdot(b_1, 0)=(a_1\cdot b_1, 0)=a_1 b_1$$

and consequently, the logical sum and the logical product are made to be entirely the same type as those of the real part, and the complex proposition can be regarded as being the development of the real proposition by regarding $(a_1, 0)$ as being identical with $a_1$. Where, the real proposition is regarded as being three valued real propositions. Accordingly, the definition of its logical sum, the logical product, when $x$ and $y$ are, respectively, made to be the real proposition ($x$ and $y$ are considered to take any value of 0, ½ or 1), becomes of course to be $$x\text{v}y \ \text{Max}\ (x, y)$$
$$x\cdot y \ \text{Min}\ (x, y)$$

that is $x\text{v}y$ takes the maximum value between values of $x$ and $y$, and $x\cdot y$ takes the minimum value between values of $x$ and $y$.

(3) A corresponding relation between a binary code and signal, complex propositional value Now, a relation between a signal wave form, a binary code and complex propositional value is assumed to correspond, as in the following table. Further, the lowest column of the signal of the following table shows when no oscillation is caused, and at this time the complex propositional value corresponds to ½v$k$½.

| Signal | Binary code | Complex propositional value |
|---|---|---|
| ΛΛΛΛΛΛ | 1 | 1v$k$½ |
| VVVVVV | 0 | ½v$k$1 |
| ——— | ------------------------ | ½v$k$½ |

Figures 7, 8, 9, 10, 11, 12, 13, 14, 15:
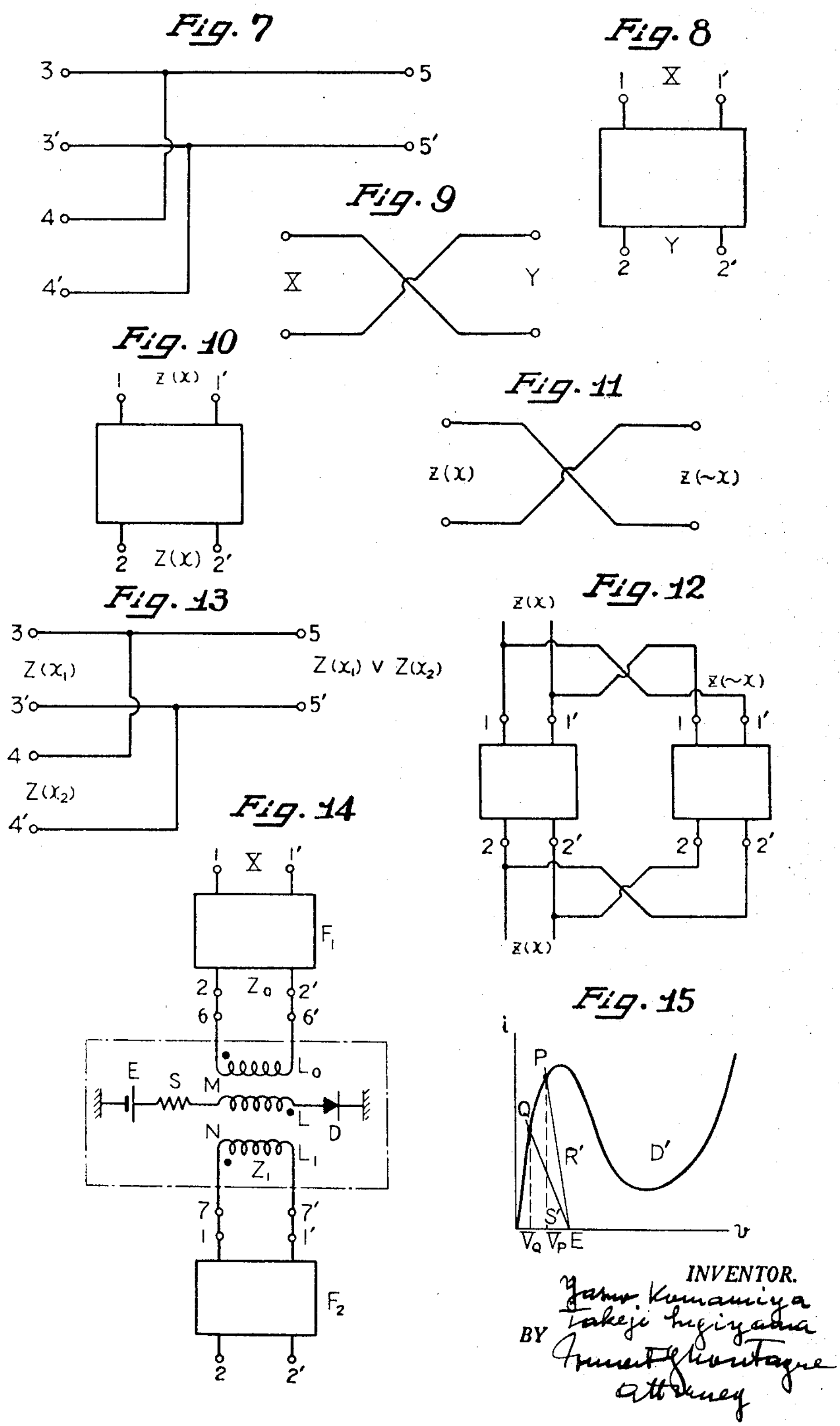

As it is clear from the above table that in the parallel circuit as shown in FIGURE 7, if the signals are received, respectively, from the terminals, 3, 3′ and the terminals 4, 4′, the signals corresponding to a complex propositional value corresponding to signals from the terminals 3, 3′ and the logical sum of the complex propositional value corresponding to the signals from the terminals 4, 4′ are going out to the terminals 5, 5′. Therefore, when the signals corresponding to, respectively, 1v$k$½, ½v$k$1 come from the terminals 3, 3′, 4, 4′, the signals corresponding to $$(1\text{v}k\tfrac{1}{2})\text{v}(\tfrac{1}{2}\text{v}k1)=(1\text{v}\tfrac{1}{2})\text{v}k(\tfrac{1}{2}\text{v}1)=1\text{v}k1$$

are produced to the terminals 5, 5′, and these signals are combined waves of electric oscillation waves having negative direct component. In this case, there is no existing binary code corresponding to 1v$k$1 in the above corresponding table, and consequently, it is necessary to avoid in the design a circuit so as to produce 1v$k$1. Accordingly, the handling of signals corresponding to such complex propositional value will be described later in the item 8. In the other cases, it is assumed that signals corresponding to the complex propositional value 1v$k$1 do not come in.

The arrangement of each circuit according to present invention will now be individually described by using, upon occasion, the electric oscillation system as above described, corresponding relations among complex three valued logical mathematics, and the binary code and signal and the complex propositional value.

(4) A repeating circuit, a negation logic circuit

In FIGURE 8, the box represents the fundamental circuit shown in FIGURE 1 except the input and output terminals 1, 1′ and 2, 2′ and the description below also the same designation is used regarding the fundamental circuit. In FIGURE 8, X of the parts 1, 1′ is the complex propositional value corresponding to the input signal and Y of the parts 2, 2′ is the complex propositional value corresponding to the output signal. In this circuit, as described by "(1) A fundamental circuit by electric oscillation system."

When $X=1\text{v}k\tfrac{1}{2}$ holds, $Y=1\text{v}k\tfrac{1}{2}$
When $X=\tfrac{1}{2}\text{v}k1$ holds, $Y=\tfrac{1}{2}\text{v}k\tfrac{1}{2}$
When $x=\tfrac{1}{2}\text{v}k\tfrac{1}{2}$ holds, $Y=\tfrac{1}{2}\text{v}k\tfrac{1}{2}$ the above results can be obtained, and consequently, $$Y=R(X)\text{v}k\tfrac{1}{2} \qquad (2)$$

the above relation is obtained.

In FIGURE 9, if complex propositional values corresponding to the signals of the input and of the output are respectively X, Y, then X and Y have a reverse actual part and parabolic part, and consequently, the relation of $$Y=kX \qquad (3)$$

is obtained. That is, if the polarity of the circuit is reversed, a complex propositional value corresponding to the signal is made to be $k$ times.

In FIGURE 10, it is assumed that the signal wave only corresponding to the binary code comes from the input terminals 1, 1′. That is, $x$ is assumed to be the input binary code (consequently, $x$ is 0 or 1) and the complex propositional value corresponding thereto is assumed to be $z(x)$. Also, it is assumed that the complex propositional value corresponding to the output signal, exerted at the output terminals 2, 2′, is represented by $Z(x)$. In the following description, the definition of $x$, $z(x)$, $Z(x)$ is the same as above. Then, if referring to the above table, the following formula $$\begin{aligned} z(x)&=\delta_1 x\text{v}\tfrac{1}{2}\,\delta_0 x\text{v}k\{\tfrac{1}{2}\,\delta_1 x\text{v}\delta_0 x\} \\ &=(\delta_1 x\text{v}\tfrac{1}{2})(\delta_1 x\text{v}\delta_0 x)\text{v}k(\tfrac{1}{2}\text{v}\delta_0 x)(\delta_1 x\text{v}\delta_0 x) \qquad (4) \\ &=\delta_1 x\text{v}\tfrac{1}{2}\text{v}k(\delta_0 x\text{v}\tfrac{1}{2}) \end{aligned}$$

is obtained. Also, by the two formulas of (2), (4)

$$Z(x)=R\{z(x)\}\text{v}k\tfrac{1}{2} \qquad (5)$$
$$=\delta_1 x\text{v}\tfrac{1}{2}\text{v}k\tfrac{1}{2} \qquad (5')$$

is obtained.

In FIGURE 9, when it is represented by $X=z(x)$, output Y is made to $kX$ by the Formula 3, and consequently, by the Formula 4, $$\begin{aligned} kz(x) &= k\{\delta_1 x \vee \tfrac{1}{2} \vee k(\delta_0 x \vee \tfrac{1}{2})\} \\ &= \delta_0 x \vee \tfrac{1}{2} \vee k(\delta_1 x \vee \tfrac{1}{2}) \\ &= \delta_1(\sim x) \vee \tfrac{1}{2} \vee k\{\delta_0(\sim x) \vee \tfrac{1}{2}\} \qquad (6) \\ &= z(\sim x) \end{aligned}$$

is obtained, and $kz(x)$ is made to the complex propositional value corresponding to the negation $\sim x$. That is, it corresponds to FIGURE 11 and this is a negation logic circuit.

Now, by the Formula 5′

$$\begin{aligned} Z(\sim x) &= \delta_1(\sim x) \vee \tfrac{1}{2} \vee k\tfrac{1}{2} \\ &= \delta_0 x \vee \tfrac{1}{2} \vee k\tfrac{1}{2} \qquad (7) \end{aligned}$$

is obtained, and consequently, by the Formulas 5′ and 7

$$\begin{aligned} Z(x) \vee kZ(\sim x) &= (\delta_1 x \vee \tfrac{1}{2} \vee k\tfrac{1}{2}) \vee k(\delta_0 x \vee \tfrac{1}{2} \vee k\tfrac{1}{2}) \\ &= \delta_1 x \vee \tfrac{1}{2} \vee k(\delta_0 x \vee \tfrac{1}{2}) \qquad (8) \\ &= z(x) \qquad (8') \end{aligned}$$

is obtained. That is, by combining a circuit as shown in FIGURE 12, $z(x)$ enters into the circuit from the upper part and also at the lower part $z(x)$ is produced. That is to say, a repeating circuit $z(x)$ is formed to produce a signal corresponding to a binary code $x$ at an output by an input signal corresponding to a binary code $x$.

In FIGURE 7, when the signals corresponding to respectively $Z(x_1)$ and $Z(x_2)$ are received at the input terminals 3, 3′ and the input terminals 4, 4′, then at the output terminals 5, 5′, $$\begin{aligned} Z(x_1) \vee Z(x_2) &= \delta_1 x_1 \vee \delta_1 x_2 \vee \tfrac{1}{2} \vee k\tfrac{1}{2} \\ &= \delta_1(x_1 \vee x_2) \vee \tfrac{1}{2} \vee k\tfrac{1}{2} \qquad (9) \\ &= Z(x_1 \vee x_2) \qquad (9') \end{aligned}$$

is obtained.

Where, by the Formula 5′, $$\begin{aligned} Z(x_1) &= \delta_1 x_1 \vee \tfrac{1}{2} \vee k\tfrac{1}{2} \\ Z(x_2) &= \delta_1 x_2 \vee \tfrac{1}{2} \vee k\tfrac{1}{2} \qquad (10) \end{aligned}$$

is obtained, that is, a circuit as shown in FIGURE 13 is formed.

(5) A directional circuit.—(1) A rectifier-like circuit

FIGURE 14 shows the combination of two fundamental circuits $F_1$, $F_2$ and modified circuits of fundamental circuits surrounded by a dash-dotted line. The dash-dotted lined part shows that a mutual induction coefficient M between L, and $L_1$ of the fundamental circuit is changed into N and also the resistance R is changed into S, and put the relation between M and N and between R and S, $$M>N$$

and $$R<S$$

FIGURE 15 shows a graph entered in FIGURE 2 with a state after the modification for indicating a state of the fundamental circuits $F_1$, $F_2$ and a state of dash-dotted lined part. In this case, it is adopted as $R<S$, and consequently, a voltage $V_Q$ at a stable point after modification is smaller than $V_P$, that is, $$V_Q<V_P$$

In this arrangement, the following adjustment can be established. If $F_1$ is electrically oscillated, the signal corresponding to $1 \vee k\frac{1}{2}$ enters the input terminals 6, 6′ by the induction, and D is electrically oscillated to produce a signal corresponding to $1 \vee k\frac{1}{2}$ at the output terminals 7, 7′, and by the induction, $F_2$ is also electrically oscillated. Inversely, when the electric oscillation is caused at $F_2$, the effect cannot cause D to oscillate. Because considering the inner part of the dash-dotted line, when D is electrically oscillated as an inevitable result by the electric oscillation of $F_1$, owing to $M>N$, the amplitude of the voltage induced at $L_1$ is slightly smaller than that in the fundamental circuit, however, it is selected so as to enable the causing of electric oscillations of $F_2$ by this signal, and inversely when $F_2$ is electrically oscillated, a signal by its oscillation is induced at $L_1$, and even when D is tried to oscillate through N by said two conditions, i.e.

$$M>N \text{ and } V_P>V_Q$$

it can be made not causing an electric oscillation at D. As above described, a signal corresponding to $1 \vee k\frac{1}{2}$ is transferred toward $F_1 \rightarrow D \rightarrow F_2$, however, in the direction of $F_2 \rightarrow D$ a signal corresponding to $1 \vee k\frac{1}{2}$ is not transferred, and consequently, the directional gain can be obtained in the circuit. Of course, even when a signal corresponding to $\frac{1}{2} \vee k1$ is given, as described in the fundamental circuit, the electric oscillations are not caused in all of $F_1$, D, $F_2$, and consequently, a directional property of this circuit becomes the form of a rectifier of one kind. That is, signals corresponding to the binary code 1 are transferred only in the direction of 7, 7′ from the terminals 6, 6′ and are not transferred in the reverse direction, and signals corresponding to binary code 0 are not transferred to any terminal side. Accordingly, a part of the dash-dotted line is called as a circuit of a rectifier property, and for the sake of simplicity hereinafter it is represented as in FIGURE 16.

As in the above, in FIGURE 14 when a signal corresponding to the complex propositional value X enters the terminals 1, 1′ of $F_1$ as an input, by Formula 2, $$\begin{aligned} Z_0 &= R(X) \vee k\tfrac{1}{2} \qquad (11) \\ Z_1 &= R(Z_0) \vee k\tfrac{1}{2} \qquad (12) \\ &= R(X) \vee k\tfrac{1}{2} \qquad (12') \\ &= Z_0 \qquad (12'') \end{aligned}$$

the above is obtained.

(5).—(2) A unilateral circuit

Figures 16, 17, 18, 19, 20, 21, 22, 23, 24:
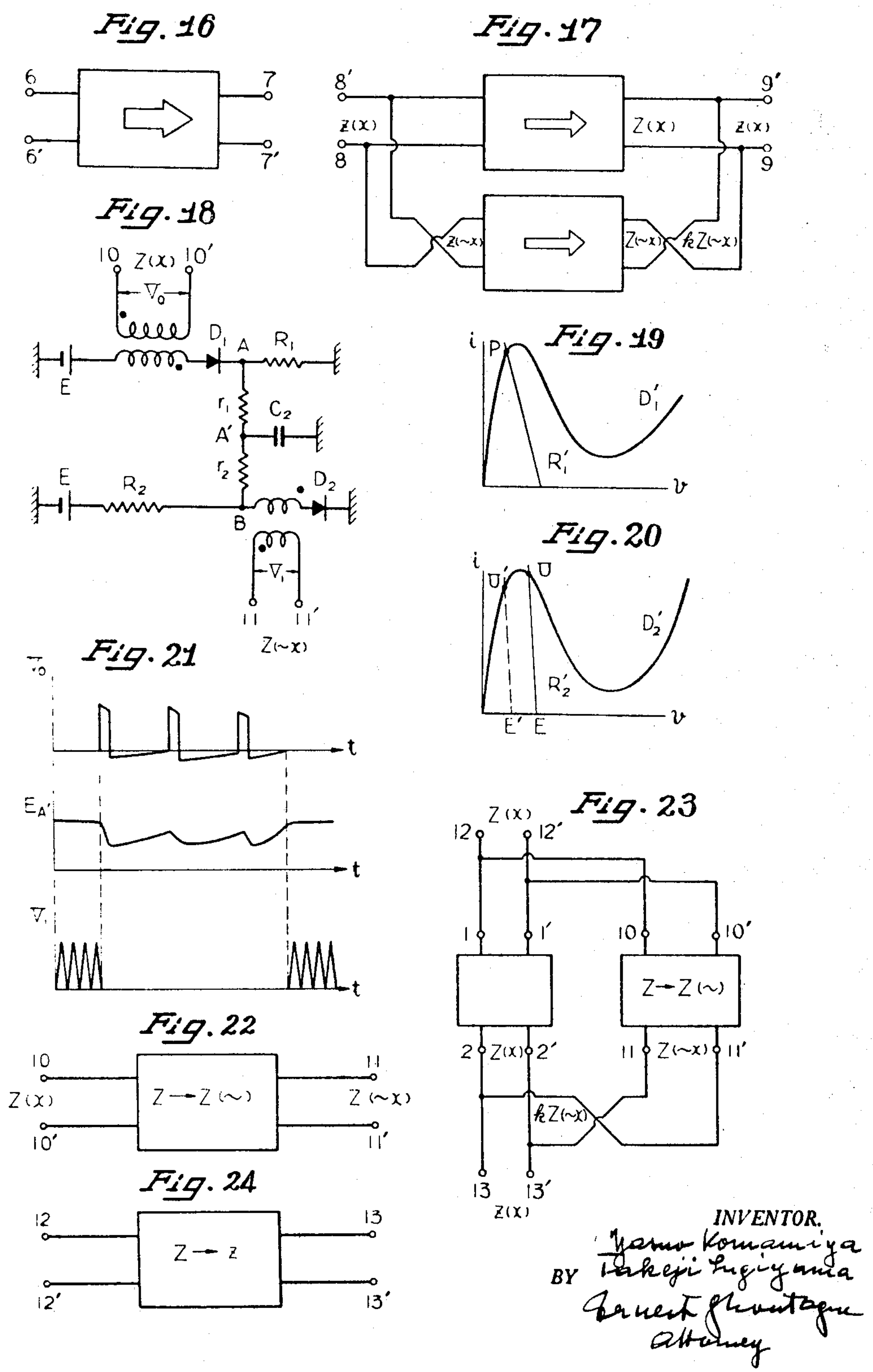

If the rectifier like circuit of FIGURE 16 is connected as shown in FIGURE 17, it forms one directional circuit in which at terminals 9, 9′ for the complex propositional value $z(x)$ corresponding to the input signal from the input terminals 8, 8′, a signal of $z(x)$ in the same is caused, and furthermore, in spite of any value of $1 \vee k\frac{1}{2}$, $\frac{1}{2} \vee k1$, that is, in spite of 0, 1 of the binary code, $z(x)$ is transferred from the terminals 6, 6′ to the direction of the terminals 9, 9′, and toward its reverse diretcion $z(x)$ is not transferred. The production of $z(x)$ at the output is caused to obtain the following result from the Formula 8′.

$$Z(x) \vee kZ(\sim x) = z(x)$$

(6) A logic circuit.—(1) a circuit containing $Z(\sim x)$ from $Z(x)$

FIGURE 18 discloses one example of circuits in which when the signal corresponding to the complex propositional value $Z(x)$ is fed from the input terminals 10, 10′, a signal corresponding to the complex propositional value $Z(\sim x)$ is produced at output terminals 11, 11′. That is, it is assumed that $D_1$ is not electrically oscillated and it is put at a monostable point P of FIGURE 19, and at that time the state of $D_2$ is adjusted so as to come to the U point of FIGURE 20. In FIGURE 20, a straight line $R_2$ shows a value combined by $R_1$, $R_2$, $r_1$, $r_2$ and the like in FIGURE 18. At that time, it is assumed that $D_2$ is electrically oscillated owing to the existence of its operating point at the point U in the region of the negative resistance. Now, when the signal corresponding to the complex propositional value $Z(x)$ is fed from the input terminals 10, 10′, so as to begin the electric oscillation of $D_1$, the voltage $E_A$ at the point A takes the form of waves as shown in FIGURE 21. However, a smoothing circuit comprising $r_1$, $r_2$, $c_2$ is connected between A and $B_1$ and consequently, it becomes equivalent as in the case of the voltage of the power source E in the circuit of $D_2$ is decreased to E′, as shown in FIGURE 20. The operating point of $D_2$ is moved from the U′ point to the U′ point or a stable point, and accordingly, the electric oscillation of $D_2$ is stopped, and the voltage wave form produced at the output terminals 11, 11′ is made in the form of $V_1$ in FIG- URE 21. In this case, the designation of the voltage wave form of $V_1$ in FIGURE 21 is used for the designation in FIGURE 4, and consequently, the terminals 11, 11' produce a signal corresponding to the complex propositional value of $Z(\sim x)$. For the sake of simplicity, FIGURE 18 hereinafter is designated as in FIGURE 22.

Now, in FIGURE 22, when a signal corresponding to a general complex propositional value X is received from the input terminals 10, 10', if a complex propositional value corresponding to a signal caused at the output terminals 11, 11' is Y, it is clear that the following relation between X and Y is obtained.

$$Y=\tfrac{1}{2}\delta_1\{ROX\}\text{v}\delta\tfrac{1}{2}\{R(x)\}\text{v}k\tfrac{1}{2}$$

Now, if it is obtained by the Formula 5', $$X=Z(x)=\delta_1 x\text{v}\tfrac{1}{2}\text{v}k\tfrac{1}{2}$$

then, naturally, $$\begin{aligned}Y&=\tfrac{1}{2}\delta_1\{\delta_1 x\text{v}\tfrac{1}{2}\}\text{v}\delta\tfrac{1}{2}\{\delta_1 x\text{v}\tfrac{1}{2}\}\text{v}k\tfrac{1}{2}\,*\\&=\tfrac{1}{2}\{\delta_1 x\text{v}\delta_1\tfrac{1}{2}\}\text{v}\delta_0 x\text{v}k\tfrac{1}{2}\\&=\tfrac{1}{2}\delta_1 x\text{v}\delta_0 x\text{v}k\tfrac{1}{2}\\&=\delta_0 x\text{v}\tfrac{1}{2}\text{v}k\tfrac{1}{2}\\&=\delta_1(\sim x)\text{v}\tfrac{1}{2}\text{v}k\tfrac{1}{2}\\&=Z(\sim x)\end{aligned}$$

*See the formula regarding (the definition 24).

is obtained.

(6).—(2) A circuit of obtaining $z(x)$ from $Z(x)$

If a circuit of obtaining $z(x)$ from $Z(x)$ is designed by utilizing FIGURE 22 and a relation of $$Z(x)\text{v}(kZ(\sim x)=z(x)$$

a circuit as shown in FIGURE 23 is obtained. That is, FIGURE 23 shows a circuit in which when a signal corresponding to $Z(x)$ from the input terminals 12, 12' is received, a signal corresponding to the binary code corresponding to $z(x)$ at the output terminals 13, 13' is produced. For the sake of simplicity, FIGURE 23 hereinafter is designated as in FIGURE 24.

(6).—(3) A logical sum circuit, a logical product circuit $x_1$, $x_2$ are assumed as two binary codes, and if complex propositional values corresponding to the signal corresponding to $x_1$, $x_2$ are, respectively, $z(x_1)$, $z(x_2)$, then by the Formula 4, $$\begin{aligned}z(x_1)&=\delta_1 x_1\text{v}\tfrac{1}{2}\text{v}k(\delta_0 x\text{v}\tfrac{1}{2})\\z(x_2)&=\delta_1 x_2\text{v}\tfrac{1}{2}\text{v}k(\delta_0 x\text{v}\tfrac{1}{2})\end{aligned}\qquad(13)$$

Accordingly, by the Formula 5'

$$\begin{aligned}Z(x_1)&=\delta_1 x\text{v}\tfrac{1}{2}\text{v}k\tfrac{1}{2}\\Z(x_2)&=\delta_1 x_2\text{v}\tfrac{1}{2}\text{v}k\tfrac{1}{2}\end{aligned}\qquad(14)$$

are obtained.

Now, in the consideration of $Z(x_1\text{v}x_2)$, by the Formula 9', $$Z(x_1\text{v}x_2)=Z(x_1)\text{v}Z(x_2)\qquad(15)$$

is obtained, and consequently, $Z(x_1\text{v}x_2)$ can be obtained by a circuit of $Z(x_1)$, $Z(x_2)$ connected in parallel as shown in FIGURE 13. Also, in order to avoid the snake path of the signal into the circuit, the rectification like circuit, shown in FIGURE 16, is utilized so as to construct a circuit for obtaining $x_1\text{v}x_2$, shown in FIGURE 25. That is, when the signal corresponding to the respectively binary code $x_1$, $x_2$ is received from two input terminals 14, 14' and 15, 15', a circuit or a logical sum circuit is formed for obtaining a signal corresponding to $x_1\text{v}x_2$ at the output terminal, and this logical sum circuit, as clear from the drawing, is also provided with directional property. When a multi-input logical sum circuit as $x_1\text{v}x_2\text{v}x_3$ is formed, it may of course be constructed as shown by dash lines in FIGURE 25. For the sake of simplicity, hereinafter the FIGURE 25 is designated as shown in FIGURE 26.

Further, a logical product circuit can be formed as shown in FIGURE 27, by utilizing a logical sum circuit used a relation of $x_1\cdot x_2=\sim(\sim x_1\text{v}\sim x_2)$. FIGURE 27 shows a circuit or a logical product circuit for obtaining a signal corresponding to $X_1\cdot x_2$ at the output terminals when a signal corresponding to, respectively, $x_1$, $x_2$ from two input terminals 17, 17', 18, 18' and this circuit is also provided with a directional property. This circuit can easily be made to form a multi input logical product circuit as $x_1\cdot x_2\cdot x_3$, and this matter is the same as that of the logical sum circuit in FIGURE 25. For the sake of simplicity, hereinafter FIGURE 27 is designated as shown in FIGURE 28.

(6).—(4) An exclusive-or circuit

A circuit for obtaining $x_1\oplus x_2$ ($\oplus$ is a symbol of an exclusive-or) from two input binary codes $x_1$, $x_2$ can be formed by utilizing both circuits of the logical sum and logical product shown in FIGURE 26 and FIGURE 28 and by using a relation of $x_1\oplus x_2=x_1\sim x_2\text{v}\sim x_1x_2$. This circuit is shown in FIGURE 29. FIGURE 29 discloses the circuit for obtaining a signal corresponding to $x_1\oplus x_2$ at the output terminals 22, 22' when the signals corresponding, respectively, to $x_1$, $x_2$ are received from the two input terminals 20, 20', 21, 21'. Whereas, in the design of such circuit, many elements are necessary, nextly the design of a circuit for obtaining directly an exclusive-or will be described.

Figures 30, 31, 32, 33, 34:
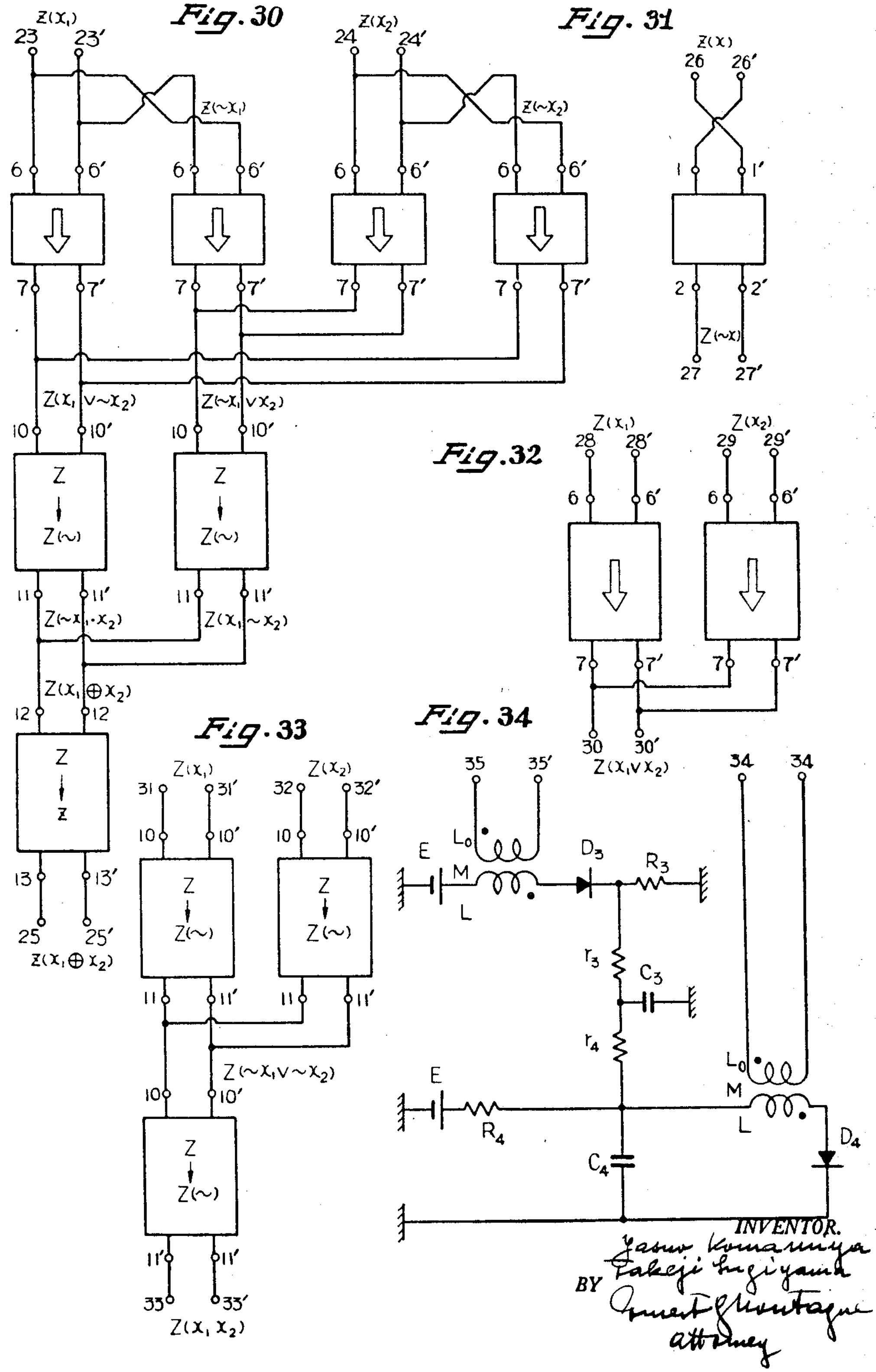

That is to say, it is clear that $$\begin{aligned}x_1\oplus x_2&=\sim x_1x_2\text{v}x_1\sim x_2\\&=\sim(x_1\text{v}\sim x_2)\text{v}\sim(\sim x_1\text{v}x_2)\end{aligned}$$

by utilizing the above formula, a circuit, as shown in FIGURE 30, may be formed. Signals of terminals 23, 23', 24, 24', 25, 25' in FIGURE 30 are, respectively, the same as the signals of the terminals of 20, 20', 21, 21', 22, 22' in FIGURE 29. Such matter is not limited to any exclusive-or and is established in the same manner also in the design of the circuit for obtaining any logic relation.

(7) The case of the item (II) having relation of the binary code and the electric signal In this case, the signal corresponding to the complex propositional value $1\text{v}k\tfrac{1}{2}$ at the binary code 1 is the same as that formerly described. However, the signal corresponding to the complex propositional value $\tfrac{1}{2}\text{v}k\tfrac{1}{2}$ is effected at the binary code 0.

Among the above described various circuits, in the circuit as shown in FIGURE 31, for the signal corresponding to the complex propositional value $z(x)$ from the input terminals 26, 26', at the output terminals 27, 27' signal corresponding to $Z(\sim x)$ is produced. In this case, the circuit as shown in FIGURE 22 may correspond to the above circuit. Accordingly, for instance, as a logical sum a circuit as shown in FIGURE 32 may be used. That is, for the respective inputs $Z(x_1)$, $Z(x_2)$ from the input terminals 28, 28', 29, 29', at the output terminals 30, 30', $Z(x_1\text{v}x_2)$ is produced. Whereas, at a logical product circuit, it should be made as shown in FIGURE 33. That is FIGURE 33 discloses a circuit in which for the inputs $Z(x_1)$, $Z(x_2)$ from the input terminals 31, 31', 32, 32', $Z(x_1\cdot x_2)$ is produced at the output terminals 33, 33'.

(8) The case of the item (III) having a corresponding relation of binary code and the electric signal In the above stated various circuits, by the selection of the circuit constant, the amplitude of the oscillatory wave may become the same amplitude in both positive and negative directions. However, in this case, the electric oscillatory wave form corresponding to the binary code has the same amplitude at both positive and negative directions, and consequently, this wave form corresponds to the complex propositional value $1\text{v}k1$, and at the binary code 0, the complex propositional value $\tfrac{1}{2}\text{v}k\tfrac{1}{2}$ corresponds in the same manner as the former item 7. And it is clear from the properties of the circuits that the circuit as described in the former item 7 or negative proposition circuit (FIGURE 22), the logical sum circuit (FIGURE 32), the logical product circuit (FIGURE 33) and the like can be also applied to this case. In this case, as a self-holding circuit, FIGURE 5 should be made as shown in FIGURE 34. That is, in FIGURE 34, when the input corresponding to 1 is received from the input terminals 34, 34', the circuit of $D_4$ starts to electrically oscillate and sustains the electric oscillation in the same manner as that in FIGURE 5. When the signal corresponding to 1 is applied to the terminals 35, 35' as an erasing signal, then a direct current like potential difference of $R_3$ is made small, and consequently, its effects is represented in the circuit of D through the smoothing circuit of $r_3$, $c_3$, $r_4$, and, thereby, the oscillation can be stopped.

As obvious from the above description, in short, the present invention is composed of an arrangement in which the electric oscillation wave having a positive direct component or electric oscillation wave having a larger amplitude in the positive direction than that in the negative direction corresponds to the binary code 1, an electric oscillation wave having negative direct component or an electric oscillation wave having larger amplitude in the negative direction than that in the positive oscillation or signal of direct component only or signal at 0 level corresponds to 0 of the binary code. For this, in a circuit in which two terminal elements having an N type volt-ampere characteristic and the resistance and the inductance are connected in series with the D.C. source, and the series resistance value is set in the circuit so as to have one stable point at said element, a circuit having a directional property is formed by the conditions of the difference of voltage at this stable point and the difference of the coupling degree with the next stage, and by the set of this series resistance value so as to have the operating point in the region of the negative resistance having characteristic of the element, a circuit if formed in which when no input signal from the forward stage is received, electric oscillations are caused, and when the input signal is received, electric oscillations are not caused. By the circuit based on a logical sum using the above property, a logical computation is to be effected.

The circuits of the present invention is divided into sections of a so called asynchronous system. However, as a signal, the oscillation wave corresponds to at least either one among 0, 1 of the binary codes, and consequently, the coupling can also be made by induction, and also owing to the use of the oscillation of the self-oscillation, the operating speed is much faster and many fan-outs can be obtained.

Further, as two terminal elements having an N-type volt-ampere characteristic in the present invention is selected so as to have only one stable point, the uniformity of the characteristic of these elements is almost out of the order and the manufacturing of the elements is very easy, and also a very stable operation is insured. Accordingly, the present invention is very useful by adopting to a logic circuit a very high speed electronic computer, and the effects in the field of the art is very great.

It will be recognized by those skilled in the art that the objects of the present invention have been achieved by providing a combination of elments to allow logical computation in cooperation with electric waves and further to use an "Esaki" diode and standard inductive, capacitive and elements to form a negative operating circuit without the requirement of resistive coupling.

While we have disclosed several embodiments of the present invention, it is to be understood that these embodiments are given by example only and not in a limiting sense, the scope of the present invention being determined by the objects and the claims.

We claim:

1. An asynchronous electronic logic circuit, comprising a two terminal element having an N-type current-voltage characteristic, a resistor, an inductance, and a D.C. source connected in series such that said circuit is provided with a monostable operating point, a reactance input means operatively coupled to said circuit, said two terminal elements operating on a stable point of the N-type characteristic curve, means for supplying an input signal in the form of a burst of electrical oscillations, representing one binary condition and the absence thereof representing the other binary condition, said input signal causing the operating point of said two terminal element to be shifted along its N-type characteristic curve so that said circuit oscillates and transmits an output signal, whereas when no input signal is received, said two terminal element returns to its stable point no oscillation being generated and said circuit transmitting no output signal.

2. An electronic logic circuit, as set forth in claim 1, wherein said reactance input means is an inductance used for coupling said input signal thereto.

3. An electronic logic circuit, as set forth in claim 1, wherein said reactance input means is a capacitor used for coupling said input signal thereto.

4. An electronic logic circuit, as set forth in claim 1, wherein said input signal in the form of said burst of electrical oscillations has a positive D.C. component and electrical oscillations of an amplitude greater in the positive direction than in the negative direction, respectively, associated to the number 1 of the binary code system, and another burst of electrical oscillations having a negative D.C. component and electrical oscillations in which the negative amplitude is greater than the positive amplitude, respectively, are associated with the number 0 of the binary code system.

5. An electronic logic circuit, as set forth in claim 4, further comprising a succeeding stage, and said circuit is formed and provided with a directional property formed by the difference of voltage at said stable point and the difference of the degree of coupling with said succeeding stage.

6. An asynchronous electronic logic circuit, comprising a two terminal element having an N-type current-voltage characteristic, a resistor, an inductance, and a D.C. source connected in series such that said circuit is provided with a monostable operating point, a reactance input means operatively coupled to said circuit, said two terminal elements operating on a stable point of the N-type characteristic curve, means for supplying an input signal in the form of a burst of electrical oscillations representing one binary condition and the absence thereof representing the other binary condition, and when no input signal is received the operating point of said two terminal element is shifted along its N-type characteristic curve so that said circuit oscillates and electric oscillations are caused and when said input signal is received said two terminal element returns to its stable point and electric oscillations are not produced.

7. The electronic logic circuit, as set forth in claim 1, further comprising a preceding stage means for providing said input signal, said resistor is modified such that the operating point of said circuit is disposed in the region of the negative resistance of the characteristic curve of said two terminal element, to obtain normal oscillations of said circuit, and a low pass filter means for varying the D.C. voltage in said circuit upon causing oscillation of said circuit by a signal from said preceding stage to stop oscillation of said circuit, whereby the occurrence and non-occurrence, respectively, of oscillations in response to the non-existence and existence of said input signal from said preceding stage can be indicated.

8. The asynchronous logic circuit, as set forth in claim 1, comprising at least two of said two terminal elements operatively coupled asynchronously.

References Cited

UNITED STATES PATENTS 3,070,708 12/1962 Dill ............... 307—206

OTHER REFERENCES

Chow et al.: Tunnel Diode Circuit Aspects and Applications, A.I.E.E. Conference Paper No. CP–60–297, 1–60 (pp. 7 and 19).

Lesk et al.: Electrical Engineering (mag.), 4–60, (p. 276).

ARTHUR GAUSS, *Primary Examiner.*

DONALD D. FORRER, *Assistant Examiner.*

U.S. Cl. X.R.

307—210, 322